United States Patent

[11] 3,628,849

[72] Inventors Jean Flamand Chatenay Malabry; Antoine Labeyrie, Gif sur Yvette; Guy Pieuchard, St-Cyr-l'Ecole, all of France

[21] Appl. No. 833,122
[22] Filed June 13, 1969
[45] Patented Dec. 21, 1971
[73] Assignee A. Jobin & G. Yvon Instruments De Precision Arcueil (Val de Marne) rue Berthollet, France
[32] Priority Mar. 26, 1969
[33] France
[31] 6908883

[54] DIFFRACTION GRATINGS
3 Claims, 16 Drawing Figs.

[52] U.S. Cl. .......... 350/162, 356/74, 356/79, 356/98
[51] Int. Cl. .......... G01j 3/18, G02b 5/18
[50] Field of Search .......... 350/3.5, 162; 356/74–101

[56] References Cited

UNITED STATES PATENTS 3,523,734 8/1970 Brehm et al. .......... 356/98 X

OTHER REFERENCES

Gerritsen et al.: " Thermally Engraved Grating using a Giant-Pulse Laser" Journal of Applied Physics, Vol. 38, No. 5, April, 1967, pages 2054–2057

*Primary Examiner*—Ronald L. Wibert
*Assistant Examiner*—F. L. Evans
*Attorney*—Waters, Roditi & Schwartz

ABSTRACT: The invention relates to new gratings constituted by a support bearing on a sensitive face the grooves of the gratings which are located at the intersection of the said face of the support by a family of surfaces geometrically such as the equiphase surfaces obtained as loci of the maxima of luminous intensity upon the interference of two beams originating from two point sources. These gratings may be realized by holography, by using as sensitive layer a layer of a photopolymerizable resin, the best results being obtained with a layer of thickness smaller than approximately 2 microns. These gratings are useful for the realization of new or improved spectrographic devices.

DIFFRACTION GRATINGS

The present invention relates to diffraction gratings.

One object of the invention is to provide diffraction gratings, of which the interval between adjacent grooves varies across the gratings according to a definite law instead of being constant as in the case with conventional gratings. These new gratings possess the advantage of being perfectly corrected from aberrations for certain wavelengths, and of having, in the other domains, a percentage aberration much smaller than that of conventional gratings.

Another aim of the invention is to provide more particularly concave diffraction gratings.

The invention also aims to provide methods of manufacturing the said gratings under favorable cost conditions and with high reliability of manufacture.

Still another aim of the invention is to improve the properties of the conventional spectroscopic devices by the use of the new gratings.

Lastly the invention aims to provide new spectroscopic devices which were impossible with the conventional gratings.

The novel and useful diffraction gratings of the invention, which comprise in a manner known per se a support having on one face the grooves of the grating, and exhibiting this fundamental peculiarity, that the said grooves are situate at the intersection on the face of a family of surfaces geometrically such as the equiphase surfaces obtained as loci of the maxima of luminous intensity upon the interference of two beams originating from two point sources, the groove spacing being determined by the angle of the two beams.

The expression "geometrically such" is used to indicate that the said surfaces have the same relative situations as the equiphase surfaces.

In the current state of the art, these gratings are very difficult to manufacture with a ruling machine, and manufacture thereof is practically impossible in the case of a concave support. It is not utterly impossible to program a ruling machine in such a way as to permit the production of gratings with variable groove spacing, but such programming is at present beyond the scope of current possibilities.

This is why it has been attempted to manufacture the gratings by using a so-called "holographic" method which consists in principle in impressing a sensitive layer deposited upon the face of the support which is required to bear the grooves, with a luminous energy concentrated upon the interference fringes of two luminous beams originating from two coherent sources, and in uncovering the said fringes in order to create furrows constituting the grooves of the grating.

This method, which has been known for several years, has hitherto been applied only for obtaining plane gratings with equidistant grooves having a relatively thick sensitive layer of the order of 10 microns, and generally speaking to the obtention of gratings with a sensitive layer of the photographic type (silver bromide-gelatin) which are necessarily thick. Now experience has shown that the conditions of use of the holographic method do not permit the gratings of the invention to be obtained in a satisfactory manner. In fact it has been found that it is on the other hand possible to obtain these gratings under excellent conditions by using as a sensitive layer a layer of a photopolymerizable resin, the best results being obtained with a layer less than approximately 2 microns in thickness.

A typical example of the manufacture of the grating according to the invention will now be given, and also various examples of gratings and spectroscopic assemblies using the said gratings, with reference to the figures of the accompanying drawing wherein.

The expression "sensitive face" will be used hereinbelow to refer to that face of the support which is required to bear the grooves of the grating.

Figure 1:
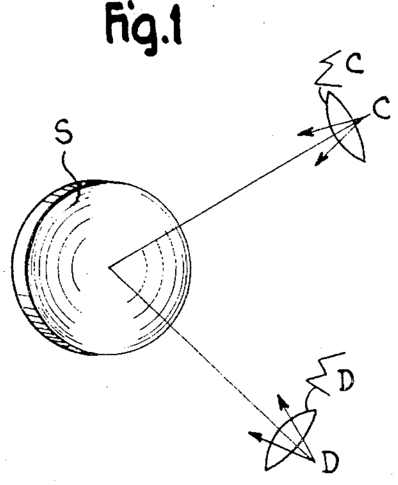
FIG. 1 is a diagram illustrating a stage of the manufacture of the grating.

FIG. 1 illustrates schematically the basic stage of manufacture of a grating by the method of the invention.

Upon the optically polished sensitive face of a support S of suitable material and shape—for example, a support of glass or silica—the sensitive face of which is concave and has, for example, the form of a spherical calotte, there is uniformly deposited a solution of photopolymerizable resin which, after evaporation of the solvent, leaves upon the support a layer of resin of constant thickness—for example, 1.5 microns in thickness. A "photoresist" type of resin used in photogravure may be used for example.

Upon the said layer P, two coherent luminous waves ΣC and ΣD emanating from two points C and D originating from a laser, are made to fall under such conditions that the interference surface of the two waves intersect the resin layer, while the luminous energy concentrated upon the said surfaces produces polymerization of the resin at the places of intersection.

Subsequently a solvent is made to act in order to dissolve selectively either the resin which has been polymerized or the resin which has not been polymerized in order to make the grooves of the grating appear.

If it is desired to obtain a grating by reflection, the surface of the grating is afterwards vacuum metallized in manner known per se.

Various examples of new and useful diffraction gratings according to the invention, and which can be manufactured industrially by virtue of this method, will be described hereinbelow, and all these gratings have in common the fact that they are constituted by a support having on a sensitive face thereof grooves corresponding to the intersection of that face of a family of equiphase surfaces such as those obtained as loci of the maxima of luminous intensity upon the interference of two beams originating from two point sources.

EXAMPLE 1

The grating is more particularly characterized in that the equiphase surfaces are hyperboloids such as those obtained as loci of the maxima of luminous intensity during the interference of two beams originating from two point sources situate at the foci of the hyperboloids, and in that the sensitive face of the support has the form of a spherical calotte, one of the said foci being located at the center of curvature of the calotte.

Figure 2:
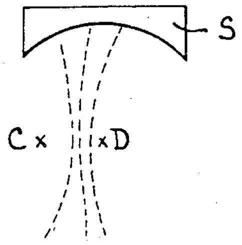
FIG. 2 is a diagram illustrating an arrangement to produce a particular grating.

FIG. 2 shows the diagram of the arrangement for constructing the grating. In this figure the two sources are designated C and D, the source D being arranged at the center of curvature of the spherical calotte, which gives the form of the sensitive face of the grating. The dash lines represent the intersection of the hyperboloids of foci C and D by the plane of the figure.

Figure 3:
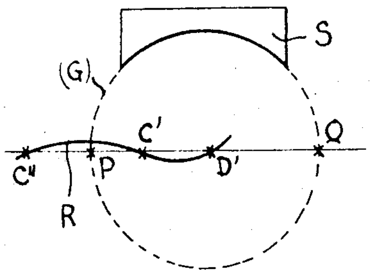
FIG. 3 shows schematically the principle of a spectroscopic device constructed with the grating of FIG. 2.

FIG. 3 shows schematically the principle of a spectroscopic device which can be constructed with this grating.

In this device, the polychromatic source A which it is desired to analyze is placed in the position D′ of the center of curvature of the spherical calotte.

Under these conditions, there is obtained in the position C′, where the source C was located during the manufacture of the grating, a strictly stigmatic image of the source A for radiations of wavelength $\lambda_{o/k}$, $\lambda_o$ being the wavelength used for the two generating beams of the grating and $k$ being a whole number.

Furthermore, considering the point C″, the harmonic conjugate of C′ with respect to the ends P and Q of that diameter of the generating sphere (G) of the calotte which passes through the point C′, with a harmonic ratio $$(PC''/PC')=(QC''/QC')=m$$

$m$ being whole or fractional, the strictly stigmatic image of the source A for radiations of wavelength $m\lambda_{o/k}$ is found at C″.

It is therefore possible to obtain the spectrum of the source by arranging a receiving means for the spectrum—for example, a photographic surface R—so that it passes substantially through the points C′, C″ and D′. Optical-receiving means for the spectrum could also be arranged at these various points.

As a modification, the source A to be analyzed may be placed at the point C′. Under these conditions, there is obtained at D′ a strictly stigmatic image of the source A for radiations of wavelengths $\lambda_{o/k}$; at the point C′ (in autocollimation) a strictly stigmatic image of the source A for radiations of wavelength $2\lambda_{o/k}$ is obtained, and at the point C″ a strictly stigmatic image of the source A for radiations of wavelength $(1+m)\ \lambda_o$ and $=(1+m)/k\ \lambda_o$ is obtained. The receiving surface for the spectrum of the source A is placed as discussed previously.

In another modification of the device, the source A to be analyzed is placed at the point C″, and a strictly stigmatic image of the source for radiations of wavelength $m\lambda_{o/k}$ is obtained at the point D′, and a strictly stigmatic image of the source for radiations of wavelength $(m+1)\lambda_o$ and $(m+1)\lambda_{o/k}$ is obtained at the point C′. The receiving surface for the spectrum is placed accordingly.

Thus, by using the concave diffraction grating of example 1, and by placing the source to be analyzed so that this is at the center of curvature of the sensitive face of the grating, or in the same position with respect to the grating as the other source which has been used to produce the grating, or again so that it is at a harmonic conjugate point of the said position with respect to the ends of that diameter of the generating sphere of the spherical calotte which passes through that position, it is possible to receive the spectrum of that source under excellent conditions upon a receiving surface preferably passing through the different possible positions of the source to be analyzed.

EXAMPLE 2

The grating is a modification of the grating of example 1 inasmuch as that of the point sources which is not at the center of curvature of the spherical calotte, instead of being at any point, is located on the Rowland circle of the grating—i.e., upon the circle lying in a plane normal to the direction of the grooves, passing though the axis of the spherical calotte which bears the grooves, and of which the diameter is equal to the radius of curvature of the grating.

Figure 4:
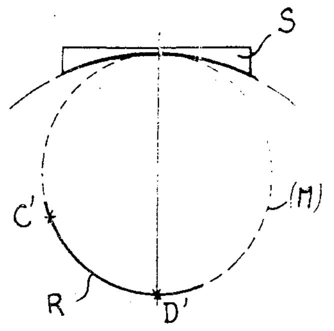
FIG. 4 illustrates another spectroscopic device using a modification of the grating of FIG. 2.

FIG. 4 shows a spectroscopic device using such a grating. In this figure D′ designates the position of the center of curvature of the spherical calotte of the grating S and C′ designates the position in which the second source of the grating was located during the production of the latter, this position lies upon the Rowland circle (M) shown by dash lines.

If the source A to be analyzed is placed at the point D′, apart from the properties already mentioned in example 1, it is found that the locus of the tangential focals of the source A for the various wavelengths are the Rowland circles, the tangential images being strictly coma-free, and that the locus of the corresponding sagittal focals is the chord C′D′.

In other words, if this device is compared with the analogous device which can be constructed with a conventional grating, it will be found that stigmatism occurs at C′ and at D′, whereas there is no stigmatism with the conventional grating, and that between these two points the astigmatism is less poor than the corresponding astigmatism of the device having a conventional grating.

A receiving surface R for the spectrum is arranged along the arc C′D′.

EXAMPLE 3

The grating is another modification of the grating of example 1 inasmuch as that of the sources which is not in the center of curvature of the calotte is located on the generating sphere (G) of the calotte.

Figure 5:
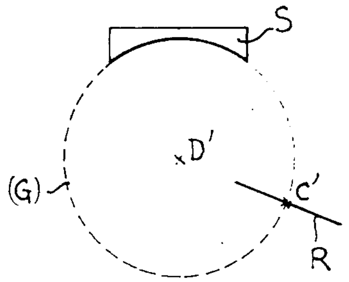
FIG. 5 illustrates a spectroscopic device using another modification of the grating of FIG. 2.

In a spectroscopic device using this grating (FIG. 5), the source A to be analyzed is placed at the center D′ of the generating sphere (G) of the spherical calotte or at the point C′ on the sphere (in autocollimation); under these conditions, a strictly stigmatic image of the source A is obtained at C′ for radiations of wavelength $\lambda_{o/k}$ or $2\lambda_{o/k}$, and also the astigmatism and the coma remain zero for points close to C′.

A receiving surface R for the spectrum of the source A is arranged so that it passes through the points C′ and D′.

EXAMPLE 4

The grating which is now in question, and wherein as in example 1 the equiphase surfaces are hyperboloids such as those obtained as loci of the maxima of luminous intensity upon the interference of two beams originating from two point sources lying at the foci of the hyperboloids, and the surface of the support has the form of a spherical calotte, is more particularly characterized by the fact that the said foci are placed symmetrically with respect to the straight line which passes through the center of curvature of the spherical calotte and the summit of that calotte.

Figure 6:
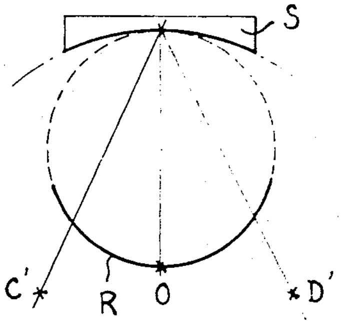
FIG. 6 to 8 illustrate spectroscopic devices using other gratings according to the invention.

FIG. 6 illustrates a spectroscopic device comprising such a grating. By placing the source A to be analyzed at the center 0 of the generating sphere of the calotte of the grating S, the locus or the tangential focal is the Rowland circle (M) shown by dash lines in the figure. The coma is zero, and the locus of the sagittal focal is the straight line tangent at D′ to the Rowland circle. A receiving surface R for the spectrum is placed so that it substantially embraces the curvature of the Rowland circle.

By way of explanation, two possible positions C′ and D′ for the point sources of constitution of the grating have also been shown in this figure.

EXAMPLE 5

The new grating in which, as in the previous examples, the equiphase surfaces are hyperboloids such as those obtained as loci of the maxima of luminous intensity upon the interference of two beams originating from two point sources, is more particularly characterized by the fact that the support has the form of an ellipsoid calotte of revolution, one of the said foci being also a focus of the ellipsoid.

Figure 7:
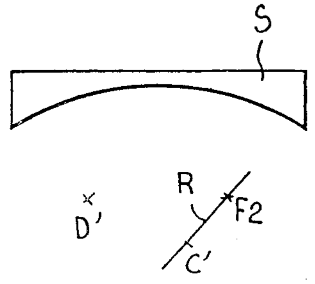

FIG. 7 illustrates a novel spectroscopic device which can be constructed with this grating.

In this figure the points C′ and D′ designate the positions which were occupied with respect to the grating S by the two point surfaces when manufacturing the grating D′ being the position $F_1$ of one of the foci of the ellipsoid. The source A to be analyzed is placed in the position C′, and a strictly stigmatic image of the source A is obtained at the position of the other focus $F_2$ of the ellipsoid for radiation of wavelength $\lambda_{o/k}$. A receiving surface R for the spectrum of the source is placed so that it passes through the position of the focus $F_2$—for example, along the straight line $C'F_2$ as shown.

EXAMPLE 6

A grating is constructed in which the equiphase surfaces are hyperboloids such as those obtained as loci of the maxima of luminous intensity upon the interference of two beams originating from two sources situated at the foci of the hyperboloids, as in the previous examples, and more particularly characterized by the fact that the support has the form of a calotte of a paraboloid of revolution, one of the said foci being also the focus of the paraboloid.

Figure 8:
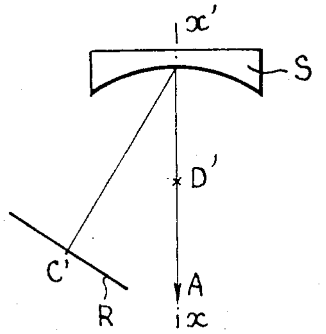

FIG. 8 illustrates a new spectroscopic device which can be constructed using this grating. In this figure C′ and D′ designate the positions which were occupied with respect to the grating by the two point sources.

If the source A to be analyzed is placed at infinity along the axis $x'x$ of the paraboloid corresponding to the grating S, a stigmatic image of the source A is obtained at the position C′ of whichever of the two point sources is not at the focus of the paraboloid, for radiations of wavelength $\lambda_{o/k}$.

The receiving surface of the spectrum is placed at R, in a plane passing through the point C′.

EXAMPLE 7

A grating is constructed, characterized by the fact that the equiphase surfaces are ellipsoids such as those obtained as loci of the maxima of luminous intensity upon the interference of two beams originating from two point surfaces located at the foci of the ellipsoids.

Figure 9:
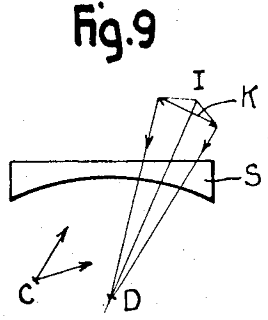
FIG. 9 illustrates a method according to the invention for obtaining another type of grating.

FIG. 9 illustrates a method recommended according to the invention to obtain this grating. This method is characterized by the fact that one of the two point sources C and D of formation of the grating—say for example, the source D—is a stigmatic image of a point source I produced through the support of the grating S by an image-forming lens K, while the source I and the forming lens may be on the same side as the other point source C with reference to the said support, or on the other side as in the case illustrated.

Under these conditions the equiphase surfaces are ellipsoids of foci C and D. These surfaces make it possible to obtain gratings of high efficiency—i.e., in which the ratio between the luminous intensity of the diffracted flux and that of the flux emitted by the source to be analyzed is high.

In order to construct a spectroscopic device with this grating the polychromatic source A to be studied is placed in the position of any one of the two sources C and D; then at the position of the other source a strictly stigmatic image of the source A is obtained for radiations of wavelength $\lambda_{o/k}$, irrespectively of the form of the support of the grating and the positions of the said locations with respect to the grating. The operator therefore has considerable latitude for placing the grating with respect to the source to be analyzed and to the receiving surface of the spectrum of that source given by the grating.

EXAMPLE 8

A grating is constructed wherein the equiphase surfaces are paraboloids of revolution such as those obtained as loci of the maxima of luminious intensity upon the interference of two beams originating from two point sources one of which is located at infinity, the support having the form of a spherical calotte, and the other of the said sources being located at the center of curvature of the calotte.

Figure 10:
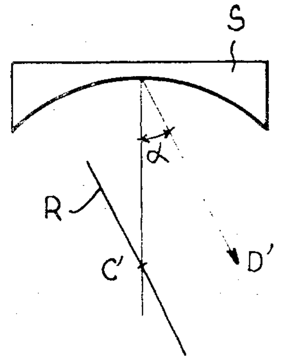
FIGS. 10 and 11 illustrate spectroscopic devices using other examples of gratings according to the invention.

FIG. 10 illustrates schematically a new spectroscopic device which can be constructed by means of this grating. In the figure C′ and D′ designate the positions which were occupied by the two point sources, namely respectively the center of curvature of the spherical calotte and a position at infinity in a direction forming an angle $\alpha$ with the axis of the said calotte.

By causing the source A to be analyzed to be placed at D′, a strictly stigmatic image of the source A is obtained at C′ for radiations of wavelength $\lambda_{o/k}$, and an image free of astigmatism and coma is obtained in proximity of C′. A receiving surface R for the spectrum of the source is arranged so as to pass through the point C′; in the device illustrated, this surface is also substantially parallel at C′ to the direction to infinity of the other source.

EXAMPLE 9

A grating is constructed wherein, as in the previous example, the equiphase surfaces are paraboloids of revolution such as those obtained as loci of the maxima of luminous intensity upon the interference of two beams originating from two point sources, one of which is located at infinity, and which is further particularly characterized by the fact that the support has the form of a calotte of a paraboloid of revolution, the said source at infinity being located on the axis of the corresponding paraboloid.

Figure 11:
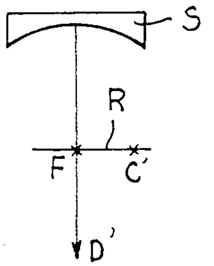

FIG. 11 illustrates schematically a new spectroscopic device which can be constructed by means of this grating. In this figure D′ designates the position to infinity of the source located at infinity on the axis of the paraboloid corresponding to the grating S, and C′ designates the position of the other source, which may be any.

By placing the polychromatic source A to be analyzed in the position C′, a stigmatic image of the source is obtained at the focus F of the paraboloid for radiations of wavelengths $\lambda_{o/k}$. A receiving surface R for the spectrum of the source is arranged so as to pass through that focus and, in the case of the device shown, it is arranged in the direction FC′.

EXAMPLE 10

A grating is constructed wherein the equiphase surfaces are spheres such as those obtained as loci of the maxima of luminious intensity upon the interference of two beams originating from two point sources merging at the common center of the spheres, one of the two sources being an image source.

Figure 12:
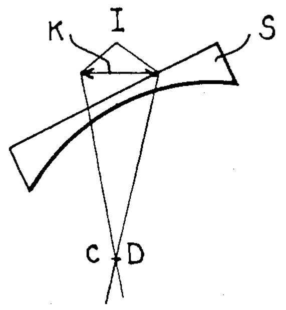
FIG. 12 illustrates the method according to the invention for obtaining a modification of a grating.

FIG. 12 illustrates a method according to the invention of constructing this grating. According to this method, one of the two sources—say the source D—is obtained by forming, at the position of the other source (or source C), the image of a source I produced through the support of the grating S by an image-forming lens K.

The points C and D are therefore at the common focusing point of two beams converging in opposite directions.

Figure 13:
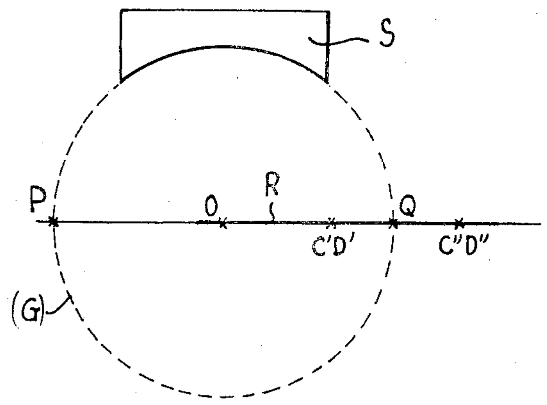
FIG. 13 illustrates the spectroscopic device using the grating of FIG. 12.

A novel spectroscopic device which can be constructed by virtue of this grating is illustrated in FIG. 13. The grating S here is constituted by a spherical calotte having its center of curvature at 0. In the figure the point C′D′ designates the common position which was occupied with respect to the grating by the two sources C and D, and the point C″D″ designates the harmonic conjugate of the point C′D′ with respect to the ends of the diameter of the generating sphere (G) of the calotte which passes through the point C′D′, the harmonic ratio being $2m-1$.

If the polychromatic source A to be analyzed is arranged at 0, a perfectly stigmatic image of this source is obtained at C′D′ for radiations of wavelength $\lambda_{o/2k}$, and a perfectly stigmatic image is obtained at C″D″ for radiations of wavelength $(m-½)\lambda_{ok}$.

If the source A is arranged at C′D′, a perfectly stigmatic image of this source is obtained at 0 for radiations of wavelength $\lambda_{o/2k}$, a perfectly stigmatic image is obtained at C′D′ for radiations of wavelength $\lambda_{o/k}$, and a perfectly stigmatic image is obtained at C″D″ for radiations of wavelength $m\lambda_{o/k}$.

It should also be observed that if the grating is rotated about a vertical axis perpendicular to the plane of the figure, the stigmatism is retained in autocollimation at the point C′D′.

A receiving surface for the spectrum given by the grating arranged so that it passes through the points C′D′, C″D″ and 0.

EXAMPLE 11

The gratings described in the previous examples are with concave support. However the invention also makes it possible to obtain plane gratings which also have very interesting properties.

For example, a grating is constructed characterized in that the equiphase surfaces are quadric surfaces of second degree (paraboloids, ellipsoids or hyperboloids) and in that the support of the grating as a plane form, one of the sources being at infinity on an axis perpendicular to the plane of the grating.

Figure 14:
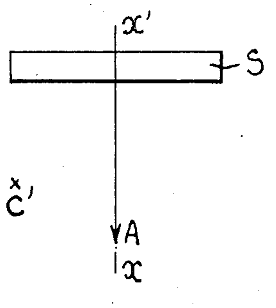
FIG. 14 illustrates a spectroscopic device using a plane grating according to the invention.

FIG. 14 illustrates a spectroscopic device using this grating. By arranging the source A to be analyzed so that it is located at infinity on the same axis $x'x$ as that mentioned hereinbefore, it is found that stigmatism occurs at the position C′ of the other source of construction of the grating (position which may be any) for radiations of wavelength $\lambda_{o/k}$, while the astigmatism remains very weak for other wavelengths.

EXAMPLE 12

Another example of the grating with very interesting properties is such, according to the invention, that the equiphase surfaces are nonquadric surfaces such as those obtained as loci of the maxima of luminous intensity upon the interference of two beams originating from two point surfaces, one of the two beams being modified by the introduction into the beam of a phase object.

The grating obtained under these conditions makes it possible to compensate the aberrations of an optical system for which it is intended.

By way of example, the manufacture and use will be described hereinbelow of a grating intended for correcting the spherical aberration of a wide aperture spectrograph objective.

Figure 16:
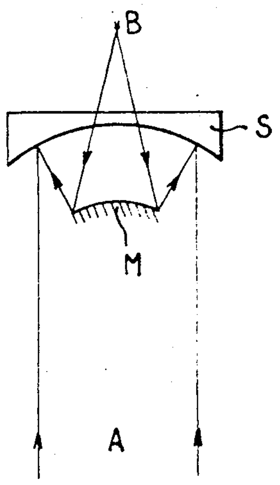
FIG. 15 illustrates a method of manufacture according to the invention for manufacturing another modification of the grating and FIG. 16 illustrates a spectroscopic device using the grating of FIG. 15.
Figure 15:
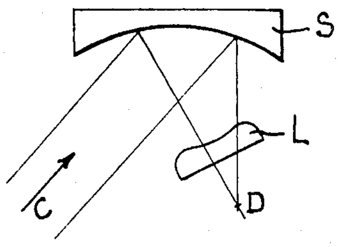

FIG. 15 illustrates the method of manufacture of the grating and FIG. 16 shows schematically the spectroscopic device for which it is intended.

In the FIG. 15 the references C and D designate the two sources of the beams which interfere in the layer deposited on the support of the grating S, this support having the form of a spherical calotte in this example. A Schmidt plate L is interposed in the beam emanating from the source D, and introduces a definite phase displacement; the source C is at infinity.

FIG. 16 shows a spectroscopic device using the grating of FIG. 15. With the source A to be analyzed located at infinity, the grating S gives an image, the forming beam of which is intercepted by the mirror M which ultimately gives an image observable at B, and which is corrected of spherical averration.

It also falls within the scope of the invention to form a plurality of gratings on one and the same support by crossing them—for example, by arranging the two sources in a first manner, then by arranging them at 90° of their first arrangement.

Finally, it is understood that the gratings are reproducible, from originals, by copying methods currently used by grating manufacturers, and may be metallized in order to constitute diffraction gratings by reflection; thus in the claims hereinbelow, the word grating embraces both originals and copies, and also metallized gratings.

What is claimed is:

1. A grooved diffraction grating being perfectly corrected for aberrations for certain wavelengths and having a percentage aberration smaller than that of conventional gratings comprising a support having a sensitive face bearing the grooves of the grating, the spacing between adjacent grating grooves varying across the grating, said grooves forming said grating defining at the intersection with said face of said support a family of hyperbolae. A diffraction grating comprising a support having a sensitive face provided with grooves of the grating, said grooves being located at the intersection on said face of the support of a family of hyperboloids.

2. A diffraction grating according to claim 1 wherein the sensitive face of the support has the shape of a spherical calotte.

3. A diffraction grating according to claim 2, wherein said spherical calotte has a center of curvature located at one of the foci of family hyperboloids whose intersection with said support defines said family of hyperbolae.

* * * * *